US008035765B2

(12) United States Patent
Tsai et al.

(10) Patent No.: US 8,035,765 B2
(45) Date of Patent: Oct. 11, 2011

(54) TFT ARRAY SUBSTRATE, LCD PANEL AND LIQUID CRYSTAL DISPLAY

(75) Inventors: Jui Hsin Tsai, Taoyuan County (TW); Chia Hua Yu, Taipei County (TW); Kun Chen Lee, Tainan County (TW)

(73) Assignee: HannStar Display Corp., Taipei County (TW)

( * ) Notice: Subject to any disclaimer, the term of this patent is extended or adjusted under 35 U.S.C. 154(b) by 0 days.

(21) Appl. No.: 12/771,633

(22) Filed: Apr. 30, 2010

(65) Prior Publication Data

US 2010/0225859 A1 Sep. 9, 2010

Related U.S. Application Data

(63) Continuation-in-part of application No. 11/559,033, filed on Nov. 13, 2006, now Pat. No. 7,800,704.

(51) Int. Cl.
*G02F 1/1343* (2006.01)

(52) U.S. Cl. .......................................... 349/39

(58) Field of Classification Search .................. None
See application file for complete search history.

(56) References Cited

U.S. PATENT DOCUMENTS

| 5,977,562 | A  | * | 11/1999 | Hirakata et al. | 257/72 |
|---|---|---|---|---|---|
| 7,023,017 | B2 |   | 4/2006  | Ahn et al. | |
| 2003/0206262 | A1 | * | 11/2003 | Kim et al. | 349/129 |
| 2004/0235227 | A1 | * | 11/2004 | Kawase | 438/158 |
| 2004/0263704 | A1 | * | 12/2004 | Oh et al. | 349/43 |
| 2005/0092991 | A1 | * | 5/2005  | Ahn et al. | 257/59 |
| 2005/0179374 | A1 | * | 8/2005  | Kwak | 313/506 |
| 2007/0040795 | A1 | * | 2/2007  | Lee et al. | 345/100 |
| 2008/0111962 | A1 | * | 5/2008  | Lin et al. | 349/139 |
| 2010/0265424 | A1 | * | 10/2010 | Chiu et al. | 349/54 |
| 2011/0006975 | A1 | * | 1/2011  | Nagashima et al. | 345/92 |

* cited by examiner

*Primary Examiner* — Mike Stahl
(74) *Attorney, Agent, or Firm* — Lowe Hauptman Ham & Berner, LLP

(57) ABSTRACT

A TFT array substrate includes gate lines, data lines, and first and second common lines. The gate lines are disposed on a transparent substrate. The first gate lines to the N+1-th gate lines are arranged in order, and N is a positive number. The data lines cross the gate lines. There is no pixel region defined by the N-th and N+1-th gate lines and adjacent two of the data lines, when N is an even number. There are two pixel regions being left and right pixel region defined by the N-th and N+1-th gate lines and adjacent two of the data lines, when N is an odd number. The first common lines are parallel to the gate lines. The second common lines are parallel to the data lines and electrically connected to the first common lines, wherein each second common line is disposed between the left and right pixel regions.

23 Claims, 17 Drawing Sheets

TFT ARRAY SUBSTRATE, LCD PANEL AND LIQUID CRYSTAL DISPLAY

CROSS REFERENCE TO RELATED APPLICATION

This application is a continuation-in-part of prior U.S. application Ser. No. 11/559,033, filed on Nov. 13, 2006, the full disclosure of which is incorporated herein by reference.

TECHNICAL FIELD

The present invention relates to a liquid crystal display, and more particularly to a TFT array substrate of an LCD panel of a liquid crystal display including first and second common lines formed to a reticular structure.

BACKGROUND

In general, a liquid crystal display (LCD) device is capable of adjusting light transmission ratios of liquid crystal cells to display image data by individually supplying data signals corresponding to the image data to the liquid crystal cells. Accordingly, the LCD device includes a liquid crystal display panel in which liquid crystal cells are aligned in a matrix configuration and a driver integrated circuit (IC).

The liquid crystal display panel includes a color filter substrate and a thin film transistor (TFT) array substrate that oppose each other and a liquid crystal layer between the color filter substrate and the TFT array substrate. The TFT array substrate includes data lines for transmitting data signals supplied from a data driver IC to the liquid crystal cells and orthogonal gate lines for transmitting scan signals supplied from a gate driver IC, wherein the liquid crystal cells are defined at intersections of the data lines and gate lines. The gate driver IC sequentially supplies scan signals to the gate lines to sequentially select liquid crystal cells on a one by one basis. In addition, the data driver IC supplies data signals to the liquid crystal cells of selected gate lines.

FIG. 1 is the top view of a conventional pixel structure. This pixel structure is called the "Cs on common" structure. This pixel structure is set on a substrate (not shown) and includes gate lines 10, a data line 11, and a thin film transistor 12. A pixel region is defined by arranging a plurality of gate lines 10 along a first direction and a plurality of data lines 11 along a second direction perpendicular to the first direction. The thin film transistor 12 includes a gate electrode 120, a channel layer 121, a source electrode 122 and a drain electrode 123. The gate electrode 120 is electrically connected to the gate line 10. The source electrode 122 is electrically connected to the data line 11. The drain 123 is electrically connected to the pixel electrode 13 through the contact window 14.

The pixel storage capacitor 16 includes a bottom electrode 15, a top electrode 17, and a dielectric layer between the bottom electrode 15 and the top electrode 17. The top electrode 17 is electrically connected to the pixel electrode 13 through the contact window 18. The bottom electrode 15 is a common line arranged in the pixel region approximately parallel to the gate line 10, and is in the first metal layer as same as the gate line 10 and the gate electrode 120. The top electrode 17, the data line 11, and the source/drain electrodes 122, 123 are formed by photographing and etching the second metal layer. A gate insulating layer (not shown) is disposed between the first metal and second metal layers. A passivation layer (not shown) is disposed between the second metal layer and the pixel electrode 13.

FIG. 2 is the top view of a conventional pixel array. In conventional pixel array, only the common lines 15 of the pixels arranged along the first direction are electrically connected. Therefore, the RC delay effect of the common line in conventional pixel array is still obvious and degrades a picture quality.

SUMMARY

The primary objective of the present invention is to provide a liquid crystal display and a manufacture method thereof for reducing RC delay effect of the common line.

The present invention provides a liquid crystal display, comprising: a gate line disposed on a substrate; a data line intersecting the gate line; a first common line parallel with the gate line; a continuous second common line intersecting through the gate line.

In one preferred embodiment of the present invention, the first common line is in the first metal layer, the second common line is in the second metal layer, and the first and second common lines are electrically connected by a conductive element made of indium tin oxide.

In another preferred embodiment of the present invention, the first and the second common line are formed by photographing and etching the first metal layer. The gate line comprises a first segment and a second segment. The first and second segments are connected by a conductive element made of indium tin oxide. The second common line passes between the first segment and the second segment or passes between the first through hole and the second through hole.

In the first to fifth embodiments of the present invention, a thin film transistor (TFT) array substrate includes a transparent substrate, a plurality of gate lines, data lines, first common lines and second common lines. The gate lines are disposed on the transparent substrate, wherein the number of the gate lines is N+1, the first gate lines to the N+1-th gate lines are arranged in order, and N is a positive number. The data lines cross the gate lines. There is no pixel region defined by the N-th and N+1-th gate lines and adjacent two of the data lines, when N is an even number. There are two pixel regions being a left pixel region and a right pixel region defined by the N-th and N+1-th gate lines and adjacent two of the data lines, when N is an odd number. The first common lines are parallel to the gate lines. The second common lines are parallel to the data lines and electrically connected to the first common lines, wherein each second common line is disposed between the left and right pixel regions.

The second common lines are electrically connected to the first common lines of the TFT array substrates in the first to fifth embodiments, whereby the first common lines and second common lines are formed to a reticular structure so as to reduce RC delay effect of the common line.

The foregoing, as well as additional objects, features and advantages of the invention will be more apparent from the following detailed description, which proceeds with reference to the accompanying drawings.

BRIEF DESCRIPTION OF THE DRAWINGS

Embodiments of the present invention are illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

Figure 1:
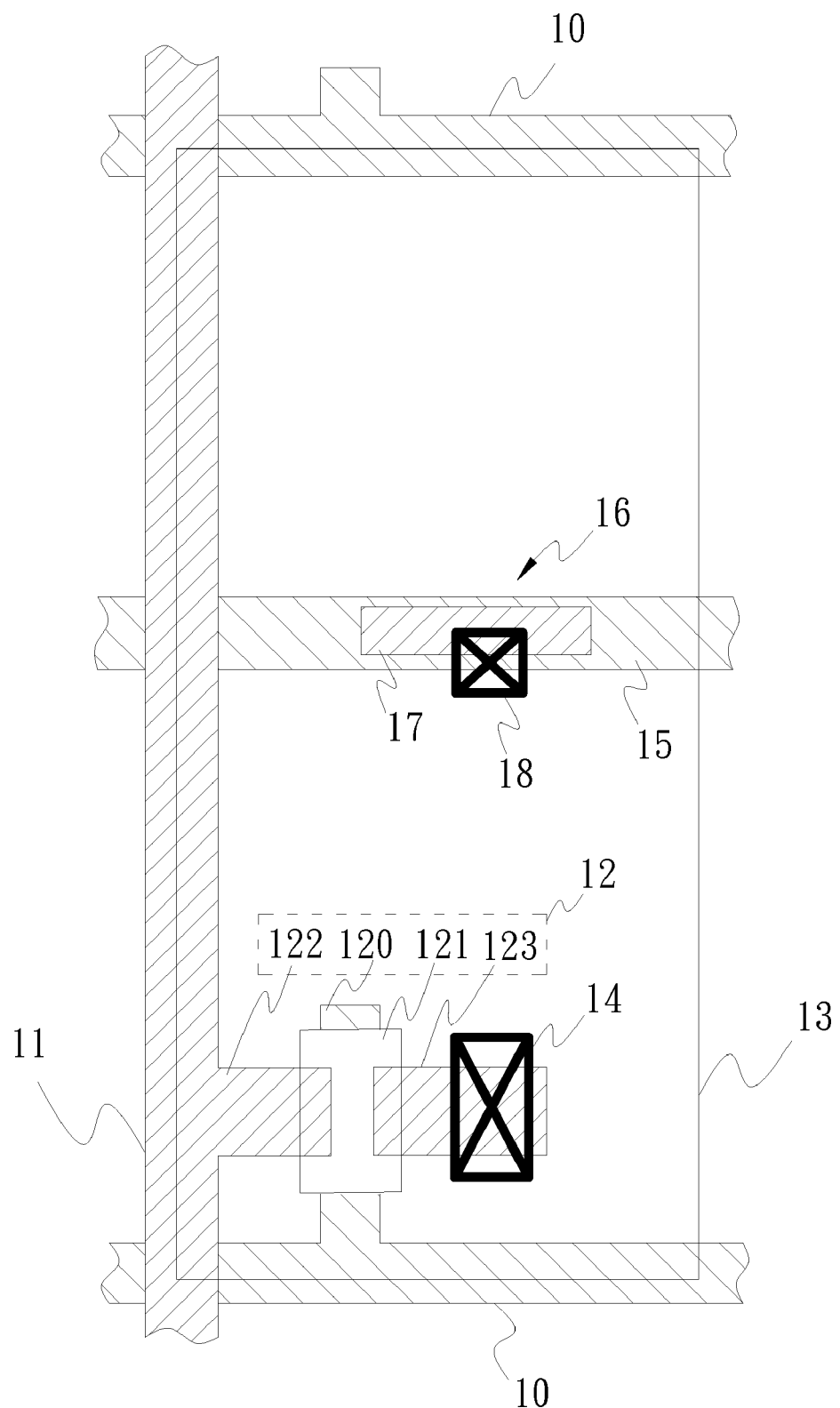
FIG. 1 is a top view of a conventional pixel structure.
Figure 2:
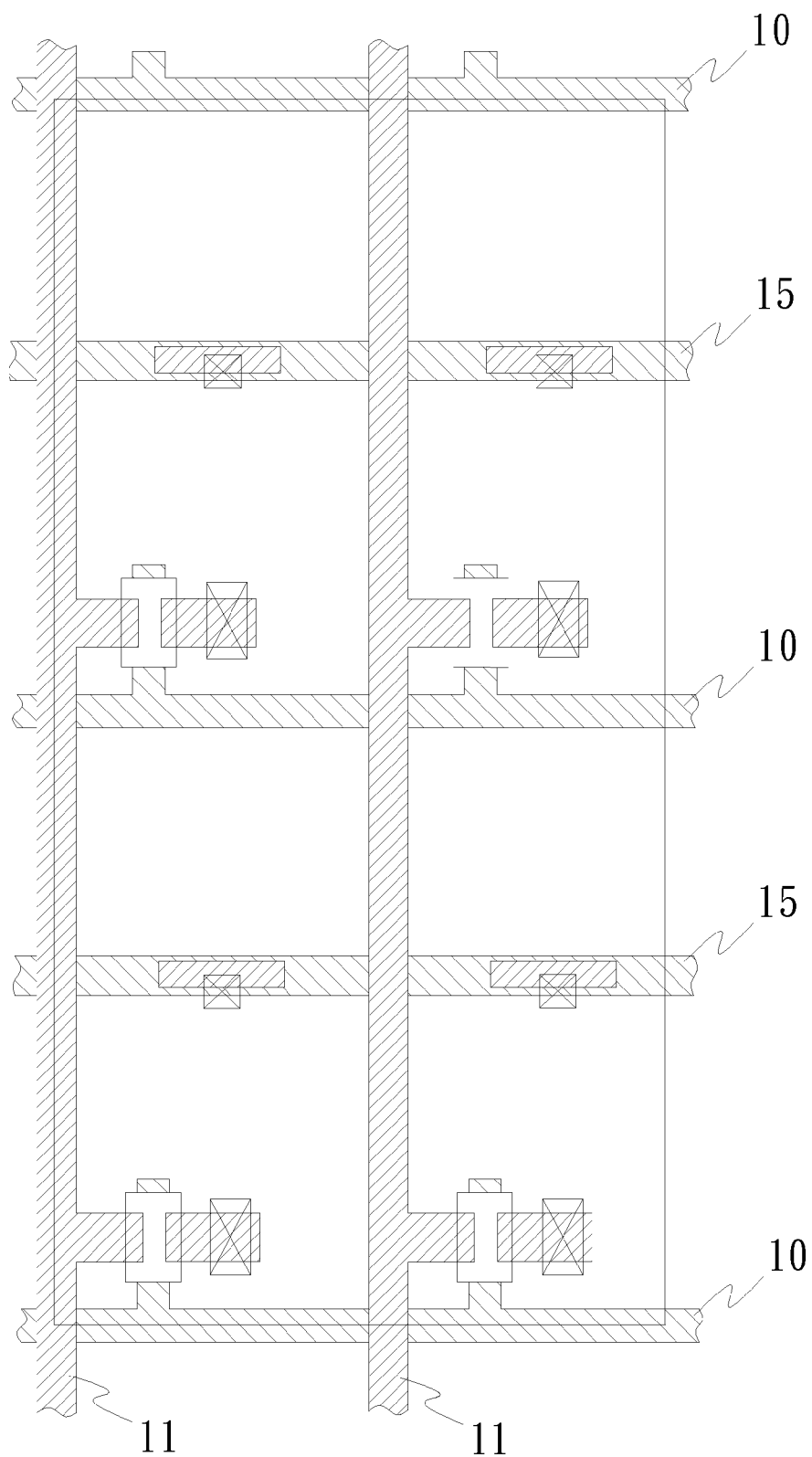
FIG. 2 is a top view of a conventional pixel array.
Figure 3:
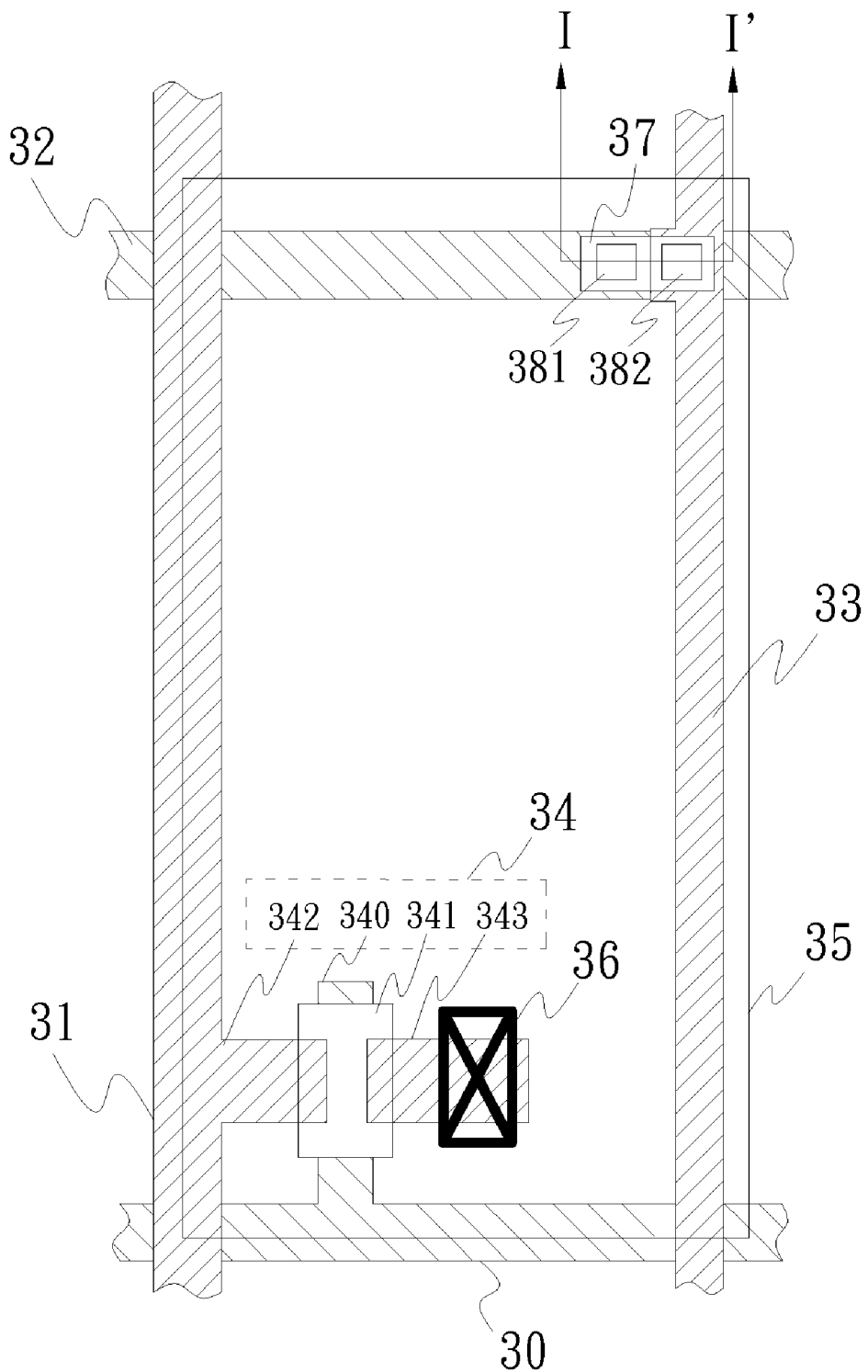
FIG. 3 is a top view of one preferred embodiment of a pixel structure of a liquid crystal display in accordance with the present invention.
Figure 4:
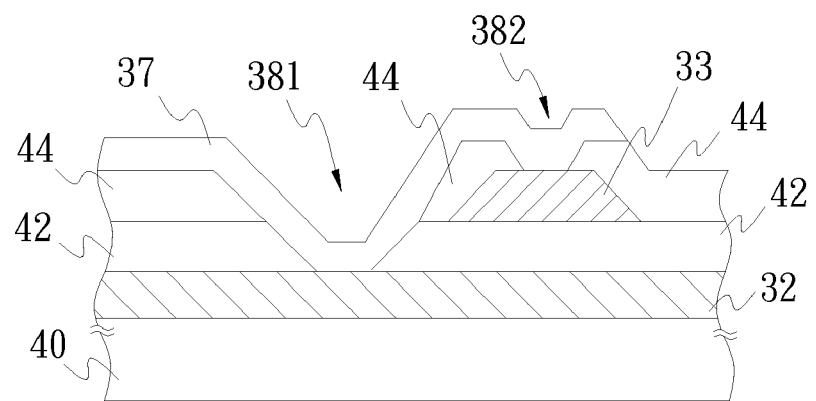
FIG. 4 is a sectional view through line I-I' as shown in FIG. 3.

FIG. 3 is a top view of one preferred embodiment of a pixel structure of a liquid crystal display in accordance with the present invention. FIG. 4 is a sectional view through line I-I' shown in FIG. 3.

In FIG. 3, the pixel structure comprises a gate line 30, a data line 31, a first common line 32, a continuous second common line 33 and a thin film transistor 34. The gate line 30 is arranged along a first direction and the data line 31 is arranged along a second direction perpendicular to the first direction. The first common line 32 is parallel with the gate line 30 and the second common line 33 intersects the gate line 30. The thin film transistor 34 includes a gate electrode 340, a channel layer 341, a source electrode 342 and a drain electrode 343. The gate electrode 340 is electrically connected to the gate line 30. The source electrode 342 is electrically connected to the data line 31. The drain electrode 343 is electrically connected to the pixel electrode 35 through the contact window 36.

The gate line 30, the first common line 32 and gate electrode 340 are formed by photographing and etching the first metal layer. The data line 31, the second common line 33, and the source electrode 342 and the drain electrode 343 are formed by photographing and etching the second metal layer. A gate insulating layer 42 is disposed between the first metal and second metal layers. The first common line 32 and the second common line 33 are electrically connected by a conductive element 37. The conductive element 37 is made of transparent conductive material, such as indium tin oxide, indium zinc oxide, aluminum-doped zinc oxide, or gallium-doped zinc oxide. A passivation layer 44 having a first through hole 381 and a second through hole 382 is set on the second common line 33, and the first through hole 381 corresponds to the first common line 32 and the second through hole 382 corresponds to the second common line 33. Therefore, the conductive element 37 electrically connects the first common line 32 and the second common line 33 via the first through hole 381 and the second through hole 382.

FIG. 4 shows the sectional view through line I-I' in FIG. 3. The method of fabricating a pixel structure of the present invention includes providing a substrate 40, wherein the substrate 40 is comprised of a glass substrate or a plastic substrate. Then a gate electrode 340, a gate line 30, and a first common line 32 are formed on the substrate 40, wherein the gate line 30 is electrically connected to the gate electrode 340 and the first common line 32 is approximately parallel to the gate line 30. The gate electrode 340, the gate line 30 and the first common line 32 belong to the first metal layer.

Then a gate insulating layer 42 is formed on the substrate 40 to cover the first metal layer including the gate electrode 340, the gate line 30 and the first common line 32. Next, a channel layer 341 is formed on the gate insulating layer 42. An ohmic contact layer (not shown) is formed on the surface of the channel layer to improve the electrical contact between the channel layer 341 and the subsequent formed source electrode 342 and drain electrode 343.

Then the data line 31 and the second common line 33 are formed on the gate insulating layer 42, and the source electrode 342 and drain electrode 343 are formed on the channel layer. The data line 31, the second common line 33, the source electrode 342 and drain electrode 343 belong to the second metal layer. The source electrode 342 is electrically connected to the data line 31. The gate electrode 340, the channel 341, the source electrode 342 and drain electrode 343 constitute a thin film transistor 34.

After forming second metal layer which includes the data line 31, the second common line 33, the source electrode 342 and drain electrode 343, a passivation layer 44 is formed on the substrate 40 to cover second metal layer. The material of the passivation layer 44 is comprised of silicon nitride or silicon oxide. Next, the passivation layer 44 and the gate insulating layer 42 are etched away to form the first through hole 381 corresponding to the first common line 32, and the passivation layer 44 is etched away to form the second through hole 382 corresponding to the second common line 33. Next, a transparent conductive material formed conductive element 37 is deposited on the passivation layer 44 so that the first common line 32 and the second common line 33 can electrically connected via the first through hole 381 and the second through hole 382. The transparent conductive material is preferably selected from a group consisting of indium tin oxide (ITO), indium zinc oxide (IZO), aluminum-doped zinc oxide (AZO), and gallium-doped zinc oxide (GZO).

Figure 5:
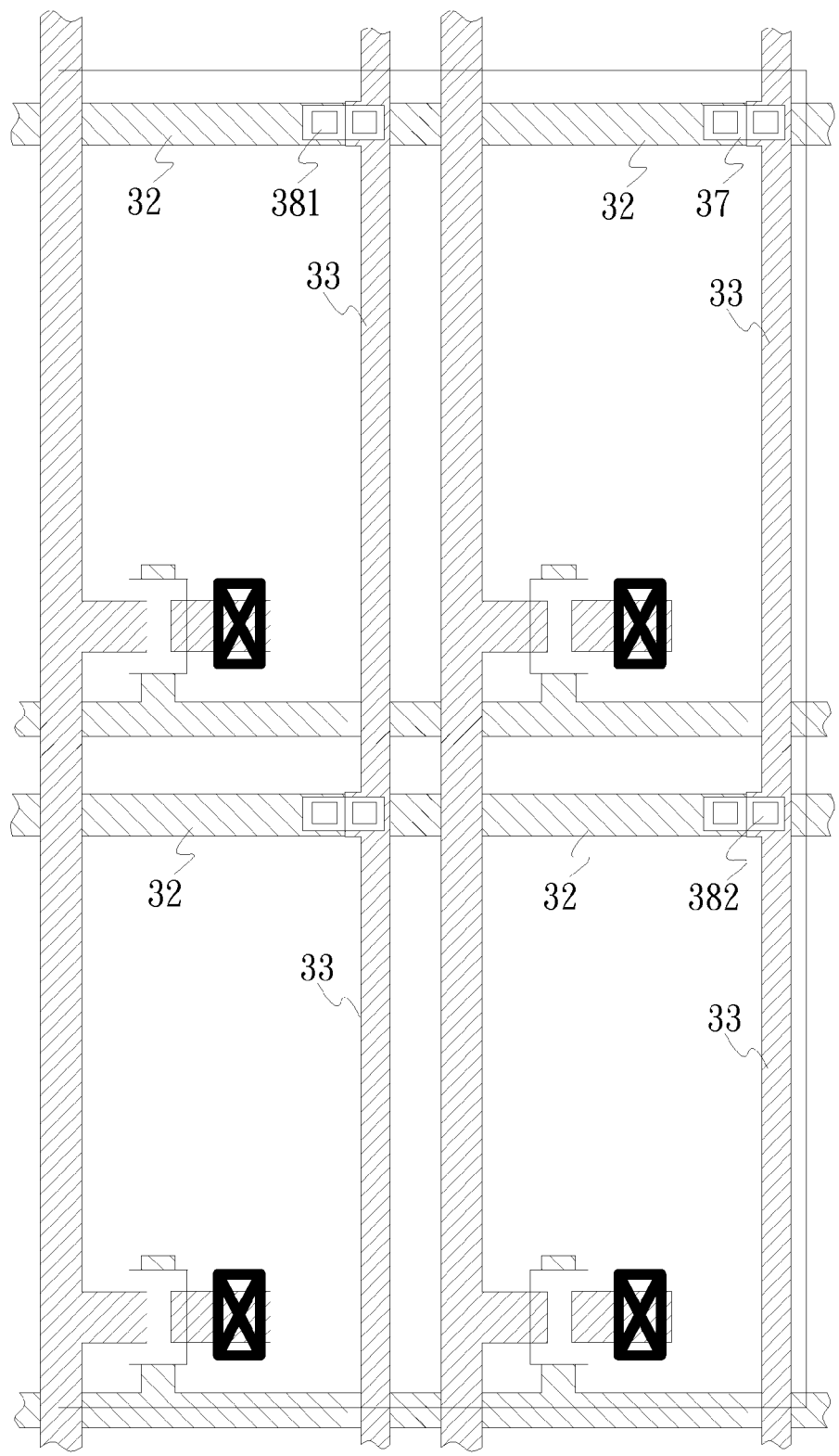
FIG. 5 is a top view of one preferred embodiment of a pixel array of a liquid crystal display in accordance with the present invention.

FIG. 5 is a top view of one preferred embodiment of a pixel array of a liquid crystal display in accordance with the present invention. In FIG. 5, first common lines 32 and second common lines 33 of pixels can be electrically connected via conductive elements 37, and form a reticular structure for reducing RC delay effect of the common line.

Figure 6:
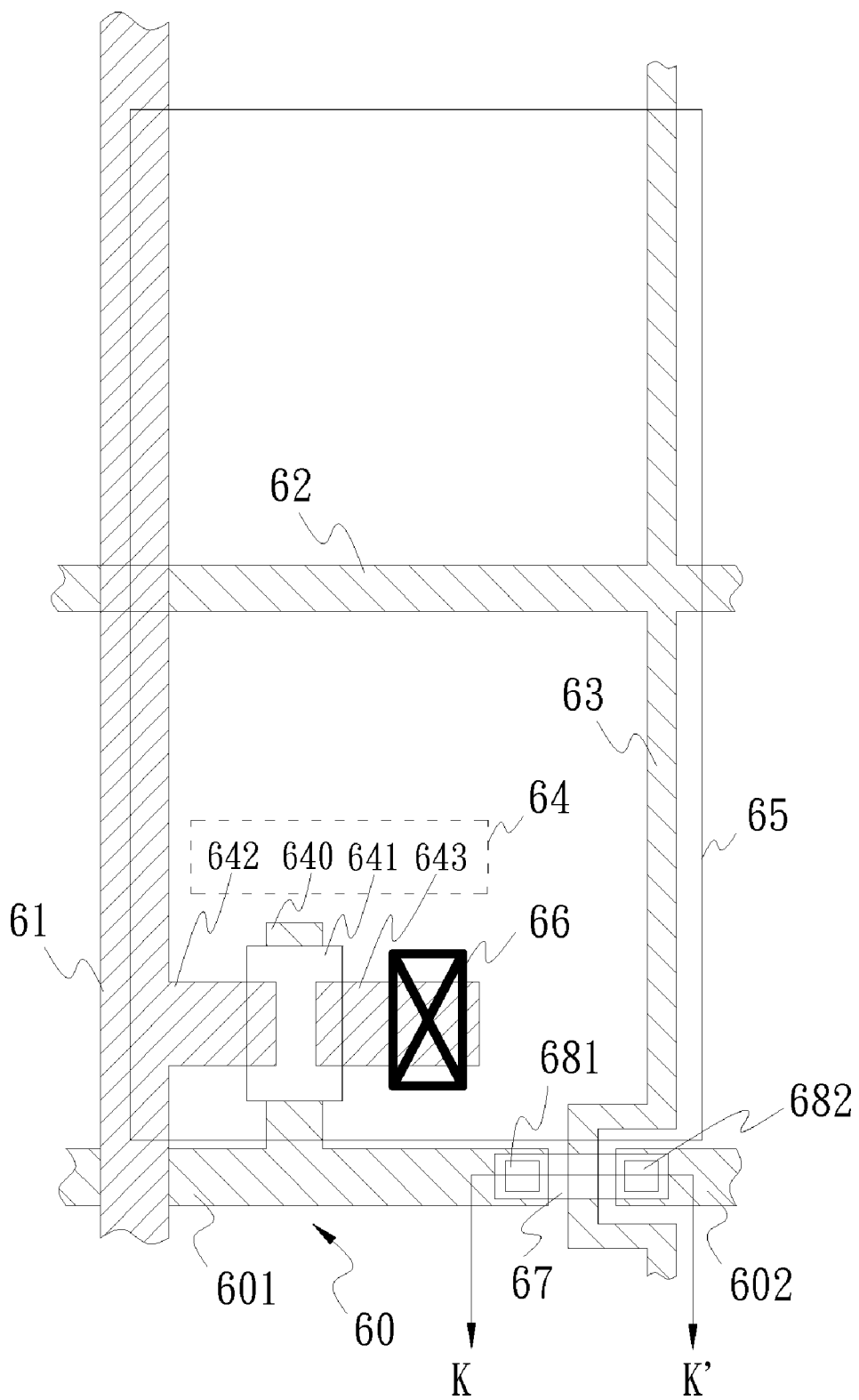
FIG. 6 is a top view of another preferred embodiment of a pixel structure of a liquid crystal display in accordance with the present invention.

FIG. 6 is a top view of another preferred embodiment of a pixel structure of a liquid crystal display in accordance with the present invention. In FIG. 6, the pixel structure comprises a gate line 60, a data line 61, a first common line 62, a continuous second common line 63 and a thin film transistor 64. The gate line 60 is arranged along a first direction and the data line 61 is arranged along a second direction perpendicular to the first direction. The first common line 62 is parallel with the gate line 60 and the second common line 63 intersects the gate line 60. The thin film transistor 64 includes a gate electrode 640, a channel layer 641, a source electrode 642 and a drain electrode 643. The gate electrode 640 is electrically connected to the gate line 60. The source electrode 642 is electrically connected to the data line 61. The drain electrode 643 is electrically connected to the pixel electrode 65 through the contact window 66.

In this embodiment of a pixel structure, the gate line 60 comprises a first segment 601 and a second segment 602. The second common line 63 passes between the first segment 601 and the second segment 602 or passes between the first through hole 681 and the second through hole 682. The first segment 601 and the second segment 602 are electrically connected by a conductive element 67 made of transparent conductive material, such as indium tin oxide, indium zinc oxide, aluminum-doped zinc oxide, and gallium-doped zinc oxide. The gate line 60, the first common line 62, the second common line 63 and gate electrode 640 are formed by photographing and etching the first metal layer. The data line 61, the source electrode 642 and the drain electrode 643 are formed by photographing and etching the second metal layer. A passivation layer 74 shown in FIG. 7 having a first through hole 681 and a second through hole 682 is set on the second common line 63, and the first through hole 681 corresponds to the first segment 601 and the second through hole 682 corresponds to the second segment 602. Therefore, the conductive element 67 electrically connects the first segment 601 and the second segment 602 via the first through hole 681 and the second through hole 682.

Figure 7:
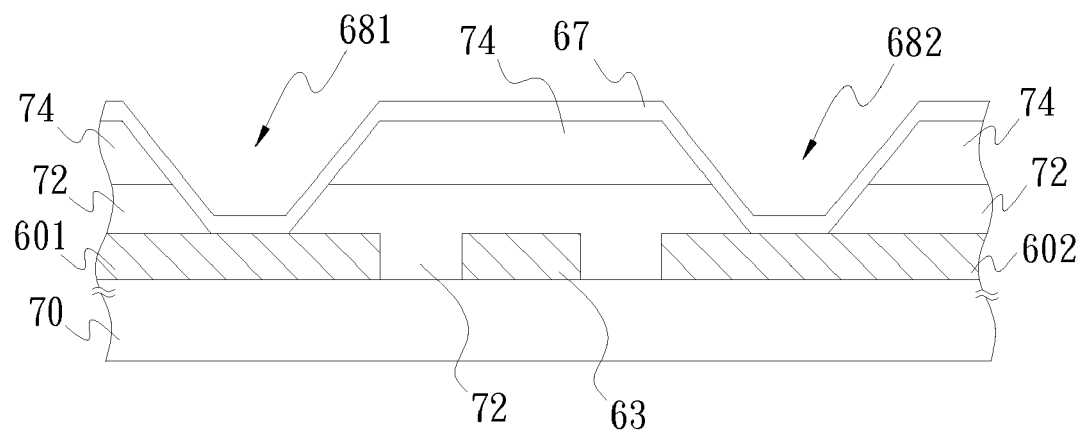
FIG. 7 is a sectional view through line K-K' as shown in FIG. 6.

FIG. 7 is a sectional view through line K-K' as shown in FIG. 6. The method of fabricating a pixel structure of the present invention includes providing a substrate 70, wherein the substrate 70 is comprised of a glass substrate or a plastic substrate. Then a gate electrode 640, a gate line 60 including the first segment 601 and the second segment 602, a first common line 62 and a continuous second common line 63 are formed on the substrate 70, wherein the gate line 60 is electrically connected to the gate electrode 640 and the first common line 62 is approximately parallel to the gate line 60. The gate electrode 640, the gate line 60, the first common line 62 and the second common line 62 belong to first metal layer.

Then a gate insulating layer 72 is formed on the substrate 70 to cover first metal layer including the gate electrode 640, the first segment 601, the second segment 602, the first common line 62 and the second common line 63. Next, a channel layer 641 is formed on the gate insulating layer 72. An ohmic contact layer (not shown) is formed on the surface of the channel layer 641 to improve the electrical contact between the channel layer 641 and the subsequent formed source electrode 642 and drain electrode 643.

Then the data line 61 is formed on the gate insulating layer 72, and the source electrode 642 and the drain electrode 643 are formed on the channel layer. The data line 61, the source electrode 642 and the drain electrode 643 belong to second metal layer (not shown). The source electrode 642 is electrically connected to the data line 61. The gate electrode 640, the channel 641, and the source electrode 642 and the drain electrode 643 constitute a thin film transistor 64.

After forming second metal layer (including the data line 31, the source electrode 642 and the drain electrode 643), a passivation layer 74 is formed on the substrate 70 to cover second metal layer. The material of the passivation layer 74 is comprised of silicon nitride or silicon oxide. Next, the passivation layer 74 and the gate insulating layer 72 are etched away to form the first through hole 681 corresponding to the first segment 601 and the second through hole 682 corresponding to the second segment 602. Next, a transparent conductive material formed a conductive element 67 is deposited on the passivation layer 74 so that the first segment 601 and the second segment 602 can electrically connected via the first through hole 681 and the second through hole 682. The transparent conductive material is preferably selected from a group consisting of indium tin oxide (ITO) and indium zinc oxide (IZO), aluminum-doped zinc oxide (AZO), and gallium-doped zinc oxide (GZO).

Figure 8:
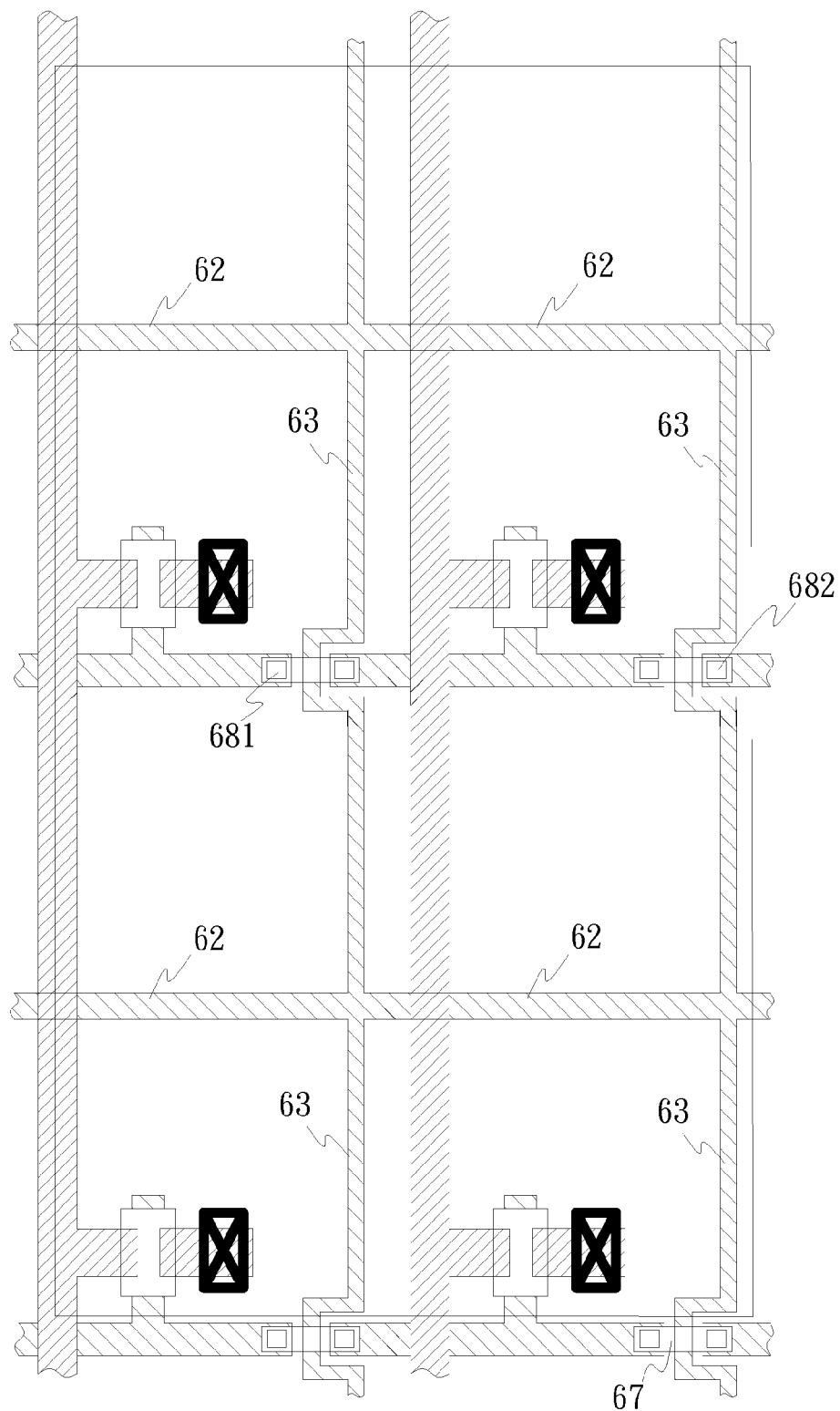
FIG. 8 is a top view of another preferred embodiment of a pixel array of a liquid crystal display in accordance with the present invention.

FIG. 8 is a top view of another preferred embodiment of a pixel array of a liquid crystal display in accordance with the present invention. In FIG. 8, first common lines 62 and second common lines 63 of pixels can be electrically connected and form a reticular structure for reducing RC delay effect of the common line.

Figure 9:
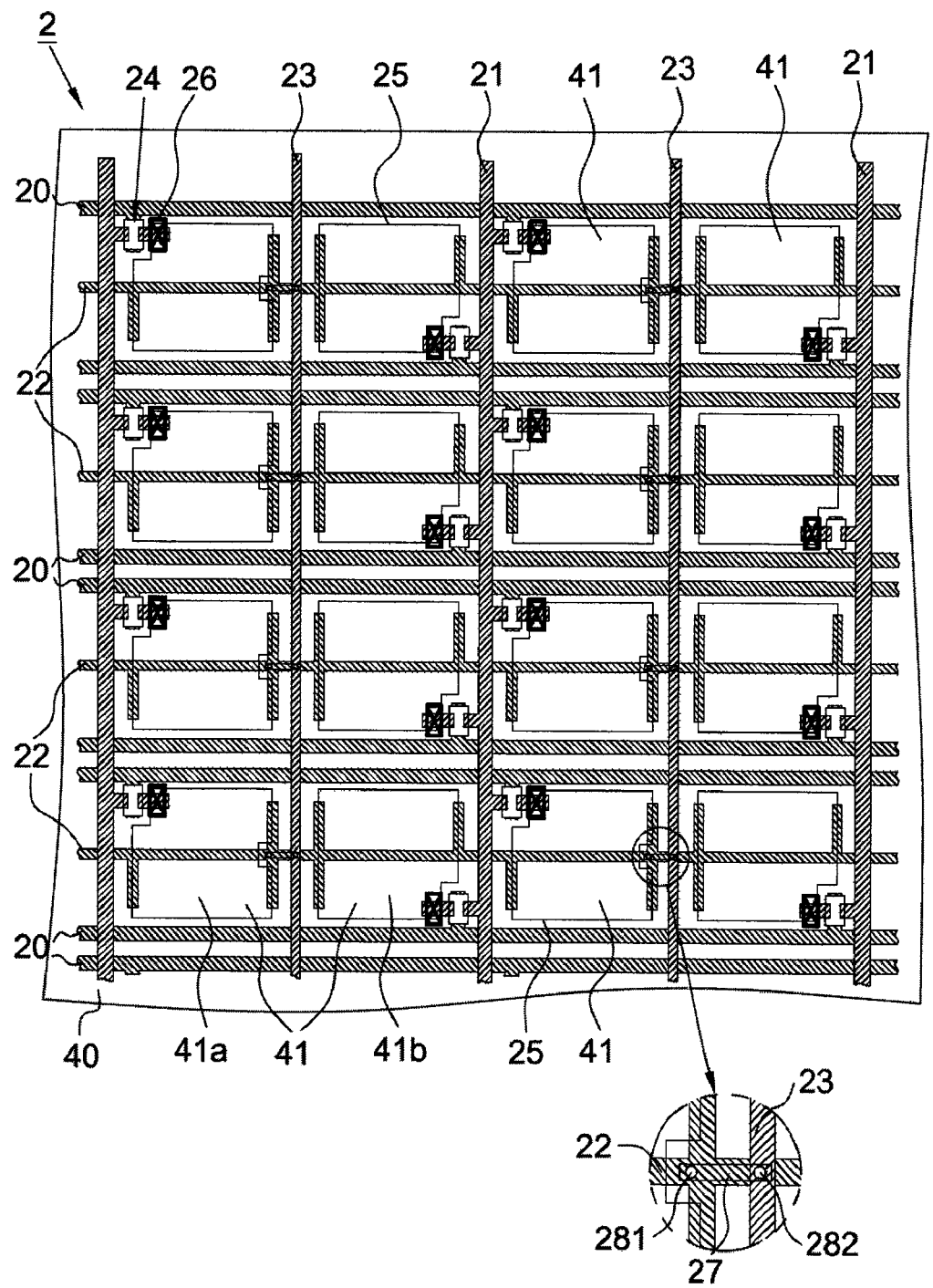
FIG. 9 is a top view of a TFT array substrate according to the first embodiment of the present invention.

FIG. 9 is a top view of a thin film transistor (TFT) array substrate 2 according to the first embodiment of the present invention. The TFT array substrate 2 includes a transparent substrate 40, a plurality of gate lines 20, data lines 21, pixel electrodes 25, first common lines 22, second common lines 23 and thin film transistors 24. The transparent substrate 40 can be a glass substrate or a plastic substrate. The gate lines 20 are disposed on the transparent substrate. The number of the gate lines 20 is N+1, the first gate lines 20 to the N+1-th gate lines 20 are arranged on the transparent substrate 40 in order, and N is a positive number. The data lines 21 cross the gate lines 20 and are perpendicular to the gate lines 20. There is no pixel region defined by the N-th and N+1-th gate lines 20 and adjacent two of the data lines 21, when N is an even number. There are two pixel regions 41 being a left pixel region 41a and a right pixel region 41b defined by the N-th and N+1-th gate lines 20 and adjacent two of the data lines 21, when N is an odd number. For example, there is no pixel region defined by the second and third gate lines 20 and adjacent two of the data lines 21, when N=2. There are two pixel regions 41 being a left pixel region 41a and a right pixel region 41b defined by the first and second gate lines 20 and adjacent two of the data lines 21, when N=1. The rest can be deduced by analogy. Two gate lines 20 are located between adjacent two of the pixel regions 41 located at upper and lower positions so as to be called as a dual gate line type pixel structure.

The first common lines 22 are parallel to the gate lines 20. The second common lines 23 are parallel to the data lines 21 and electrically connected to the first common lines 22. There is no data line located between the left and right pixel regions 41a, 41b, and thus each second common line 23 can be disposed between the left and right pixel regions 41a, 41b. The pixel electrodes 25 are disposed in the pixel regions 41 respectively. Each thin film transistor 24 has a drain electrode which is electrically connected to the pixel electrode via a through hole 26.

Particularly, the second common line 23 is located between the pixel electrodes 25 of the left and right pixel regions 41a, 41b. The capacitance between the adjacent two pixel electrodes 25 with the second common line 23 located therebetween is less than the capacitance between the adjacent two pixel electrodes 25 without the second common line 23 located therebetween. In other words, the coupling between the adjacent two pixel electrodes 25 with the second common line 23 located therebetween is lower than the coupling between the adjacent two pixel electrodes 25 without the second common line 23 located therebetween. The reduction of the coupling between the adjacent two pixel electrodes 25 can solve a problem of bright and dark lines.

In the first embodiment, the gate lines 20 and the first common lines 22 are formed by photographing and etching a first metal layer (i.e. M1), and the data lines 21 and the second common 23 lines are formed by photographing and etching a second metal layer (i.e. M2). A gate insulating layer (not shown) is disposed between the first and second metal layers. A passivation layer (not shown) is disposed on the second common line 23. A plurality of first through holes 281 are formed in the gate insulating and passivation layer and corresponding to the first common lines 22 respectively, and a plurality of second through holes 282 are formed in the passivation layer and corresponding to the second common lines 23 respectively. Each conductive element 27 is adapted to connect the first common line 22 to the second common line 23 via the first and second through holes 281, 282. The conductive element 27 and the pixel electrode 25 can be made of same transparent conductive material. In other words, the conductive element 27 and the pixel electrode 25 can be simultaneously formed by the same photographing and etching processes so as not to increase the manufacture time and cost.

Furthermore, the data lines 21 and the second common lines 23 are simultaneously formed by the same second metal layer, and thus the data lines 21 and the second common lines 23 are located at the same level. The capacitance between the second common line 23 and the data line 21 in a dual gate line type pixel structure is less than the capacitance between the second common line and the data line in a conventional pixel structure (i.e., the conventional pixel structure is not a dual gate line type pixel structure). In other words, the coupling between the second common line 23 and the data line 21 in the dual gate line type pixel structure is lower than the coupling between the second common line and the data line in the conventional pixel structure.

In addition, the aperture ratio of a pixel region in a conventional pixel structure (i.e., the conventional pixel structure is not a dual gate line type pixel structure) is reduced, when the second common line is additional. Likewise, the aperture ratio of a pixel region 41 in a dual gate line type pixel structure is also reduced, when the second common line 23 is also additional. However, the reduction rate of the aperture ratio of the pixel region 41 in the dual gate line type pixel structure is less than that in the conventional pixel structure, because the second common line is located between the left and right pixel regions 41a, 41b, i.e., the second common line 23 does not occupy the pixel region 41.

Figure 10:
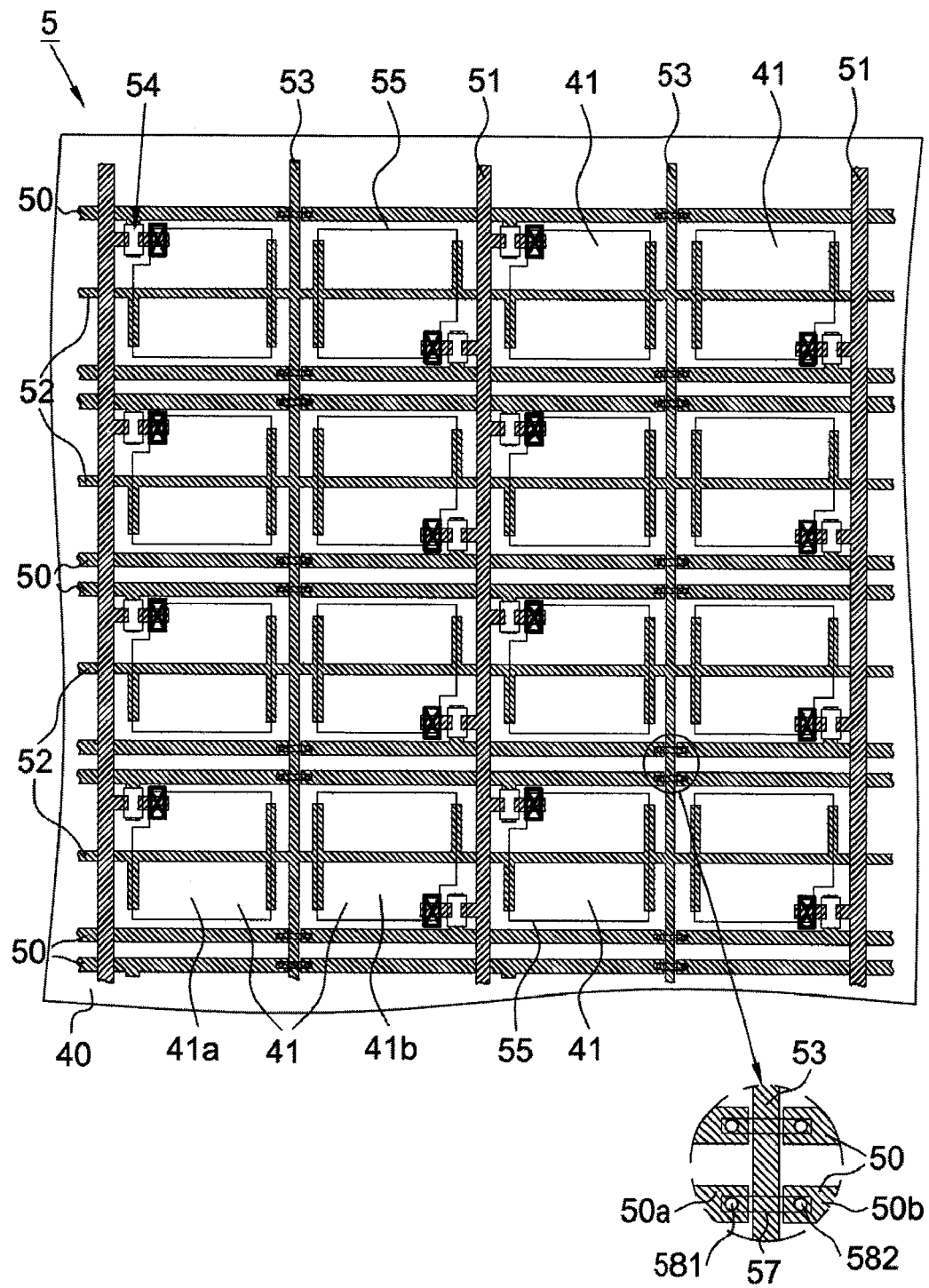
FIG. 10 is a top view of a TFT array substrate according to the first example of the second embodiment of the present invention.

FIG. 10 is a top view of a thin film transistor (TFT) array substrate 5 according to the first example of the second embodiment of the present invention. The TFT array substrate 5 in the second embodiment is similar to the TFT array substrate 2 in the first embodiment, wherein the similar elements are designated with the similar reference numerals. The TFT array substrate 5 includes a transparent substrate 40, a plurality of gate lines 50, data lines 51, pixel electrodes 55, first common lines 52, second common lines 53 and thin film transistors 54.

The first common lines 52 are parallel to the gate lines 50. The second common lines 53 are parallel to the data lines 51 and electrically connected to the first common lines 52. There is no data line located between the left and right pixel regions 41a, 41b, and each second common line 53 can be disposed between the left and right pixel regions 41a, 41b. The pixel electrodes 55 are disposed in the pixel regions 41 respectively. Particularly, the second common line 53 is located between the pixel electrodes 55 of the left and right pixel regions 41a, 41b. The coupling between the adjacent two pixel electrodes 55 with the second common line 53 located therebetween is lower than the coupling between the adjacent two pixel electrodes 55 without the second common line 53 located therebetween. The reduction of the coupling between the adjacent two pixel electrodes 55 can solve a problem of bright and dark lines.

Referring to FIG. 10 again, in the first example of the second embodiment, the differences between the TFT array substrate in the second and first embodiments is that the gate lines 50 and the first and second common lines 52, 53 are formed by photographing and etching a first metal layer, and the data lines 51 are formed by photographing and etching a second metal layer. A gate insulating layer (not shown) is disposed between the first and second metal layers. The gate line 50 includes a first segment 50a and a second segment 50b.

A plurality of first through holes 581 are formed in the gate insulating layer and corresponding to the first segment 50a. A plurality of second through holes 582 are formed in the gate insulating layer and corresponding to the second segment 50b. Each conductive element 57 is adapted to connect the first segment 50a to the second segment 50b via the first and second through holes 581, 582. The conductive element 57 located between the first and second segments 50a, 50b of the gate line 50 crosses the second common line 53. The conductive element 57 and the pixel electrode 55 can be made of same transparent conductive material. In other words, the conductive element 57 and the pixel electrode 55 can be simultaneously formed by the same photographing and etching processes so as not to increase the manufacture time and cost.

Figure 11:
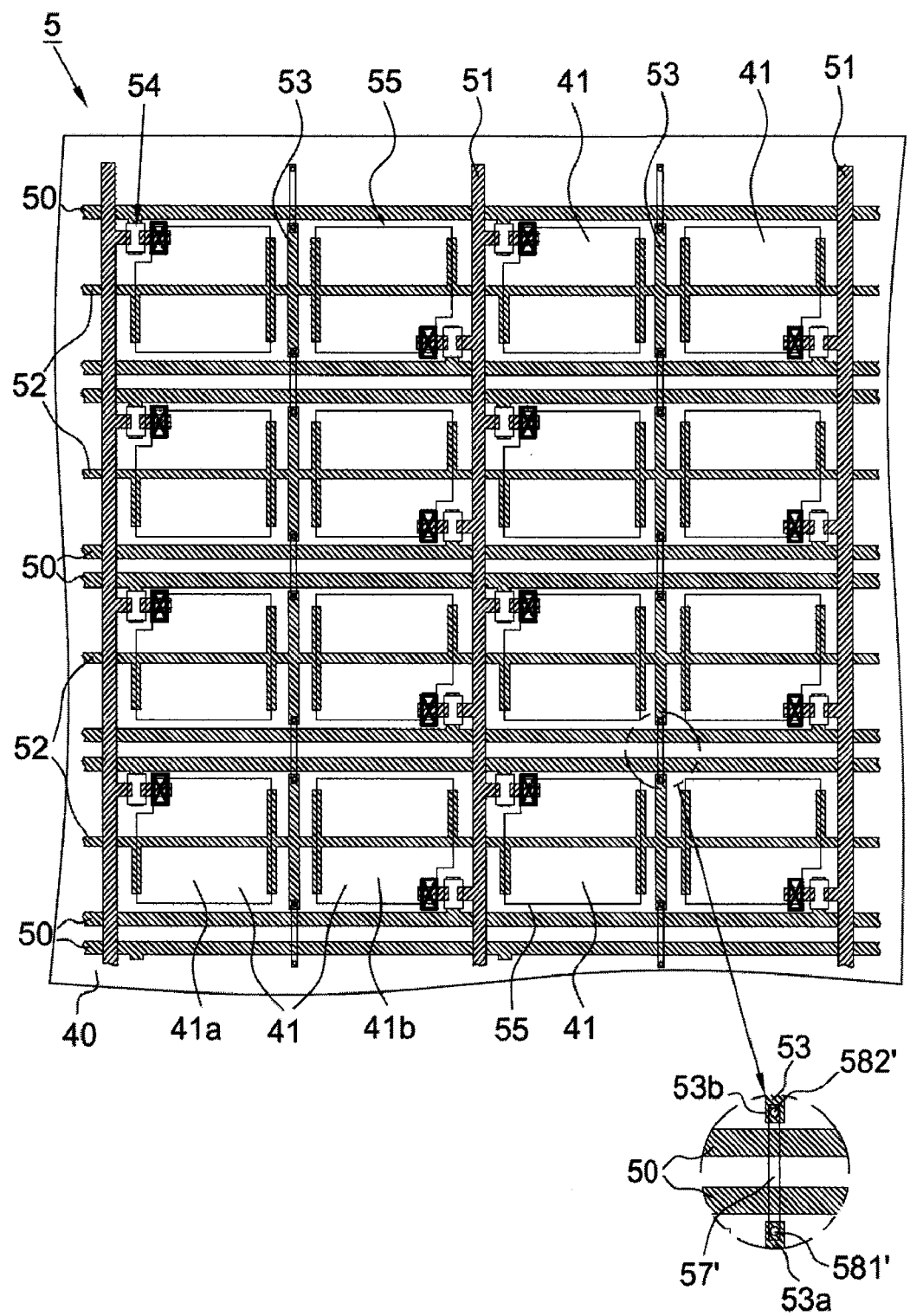
FIG. 11 is a top view of a TFT array substrate according to the second example of the first embodiment of the present invention.

Referring to FIG. 11, in the second example of the second embodiment, the gate lines 50 and the first and second common lines 52, 53 are also formed by photographing and etching a first metal layer, and the data lines 51 are also formed by photographing and etching a second metal layer. A gate insulating layer (not shown) is also disposed between the first and second metal layers. The differences between the TFT array substrate in the second and first examples of the second embodiment is that the second common line 53 includes a first segment 53a and a second segment 53b.

A plurality of first through holes 581' are formed in the gate insulating layer and corresponding to the first segment 53a. A plurality of second through holes 582' are formed in the gate insulating layer and corresponding to the second segment 53b. Each conductive element 57' is adapted to connect the first segment 53a to the second segment 53b via the first and second through holes 581', 582'. The conductive element 57' located between the first and second segments 53a, 53b of the second common line 53 crosses the gate lines 50. The conductive element 57' and the pixel electrode 55 can be made of same transparent conductive material. In other words, the conductive element 57' and the pixel electrode 55 can be simultaneously formed by the same photographing and etching processes so as not to increase the manufacture time and cost.

Figure 12:
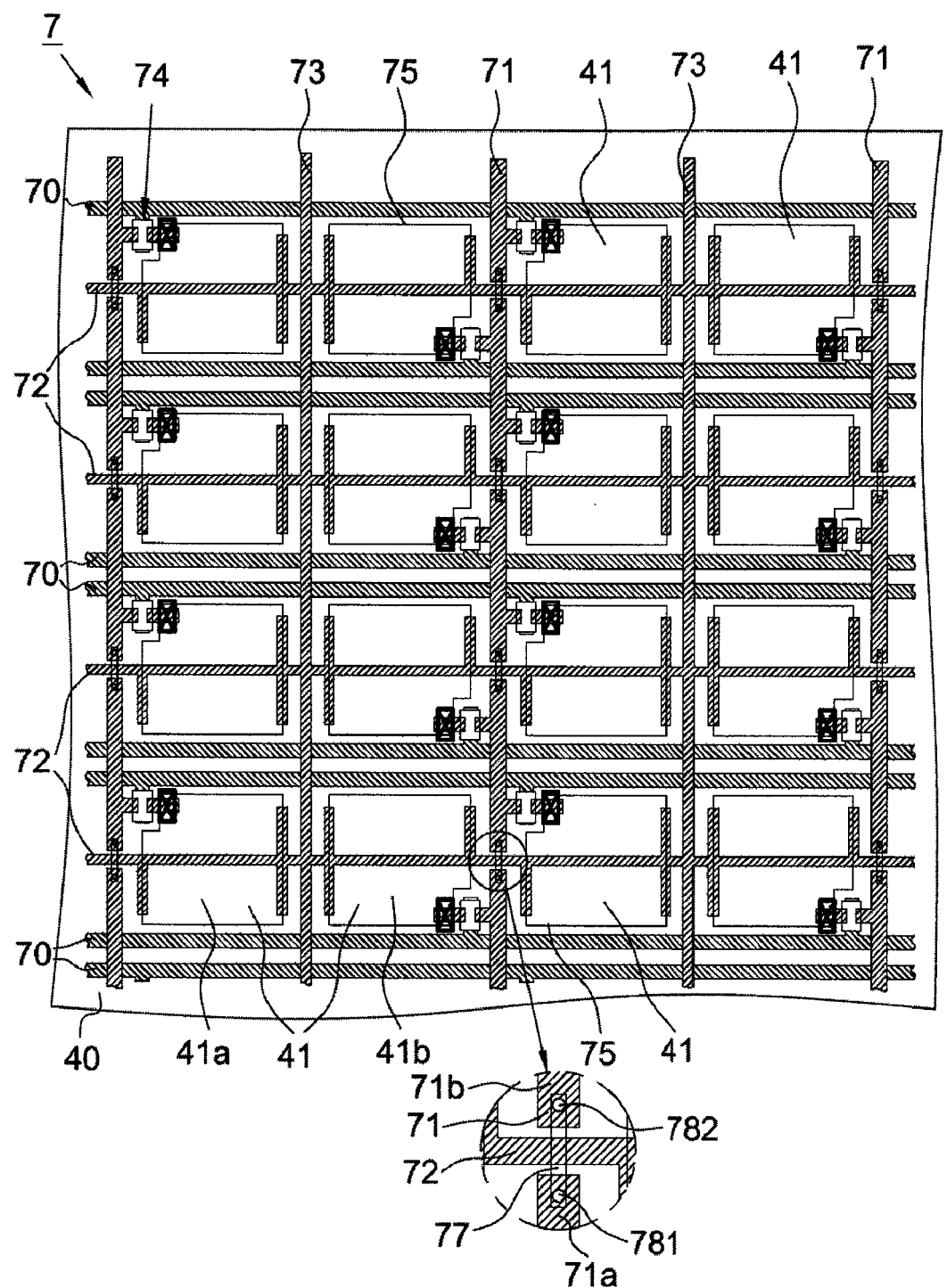
FIG. 12 is a top view of a TFT array substrate according to the first example of the third embodiment of the present invention.

FIG. 12 is a top view of a thin film transistor (TFT) array substrate 7 according to the first example of the third embodiment of the present invention. The TFT array substrate 7 in the third embodiment is similar to the TFT array substrate 2 in the first embodiment, wherein the similar elements are designated with the similar reference numerals. The TFT array substrate 7 includes a transparent substrate 40, a plurality of gate lines 70, data lines 71, pixel electrodes 75, first common lines 72, second common lines 73 and thin film transistors 74.

The first common lines 72 are parallel to the gate lines 70. The second common lines 73 are parallel to the data lines 71 and electrically connected to the first common lines 72. There is no data line located between the left and right pixel regions 41a, 41b, and thus each second common line 73 can be disposed between the left and right pixel regions 41a, 41b. The pixel electrodes 75 are disposed in the pixel regions 41 respectively. Particularly, the second common line 73 is located between the pixel electrodes 75 of the left and right pixel regions 41a, 41b. The coupling between the adjacent two pixel electrodes 75 with the second common line 73 located therebetween is lower than the coupling between the adjacent two pixel electrodes 75 without the second common line 73 located therebetween. The reduction of the coupling between the adjacent two pixel electrodes 75 can solve a problem of bright and dark lines.

Referring to FIG. 12 again, in the first example of the third embodiment, the differences between the TFT array substrate in the third and first embodiments is that the gate lines 70 are formed by photographing and etching a first metal layer, and the data lines 71 and the first and second common lines 72, 73 are formed by photographing and etching a second metal layer. A passivation layer (not shown) is disposed on the first and second common line 72, 73. The data line 71 includes a first segment 71a and a second segment 71b.

A plurality of first through holes 781 are formed in the passivation layer and corresponding to the first segment 71a. A plurality of second through holes 782 are formed in the passivation layer and corresponding to the second segment 71b. Each conductive element 77 is adapted to connect the first segment 71a to the second segment 71b via the first and second through holes 781, 782. The conductive element 77 located between the first and second segments 71a, 71b of the data line 71 crosses the first common line 72. The conductive element 77 and the pixel electrode 75 can be made of same transparent conductive material. In other words, the conductive element 77 and the pixel electrode 75 can be simultaneously formed by the same photographing and etching processes so as not to increase the manufacture time and cost.

Figure 13:
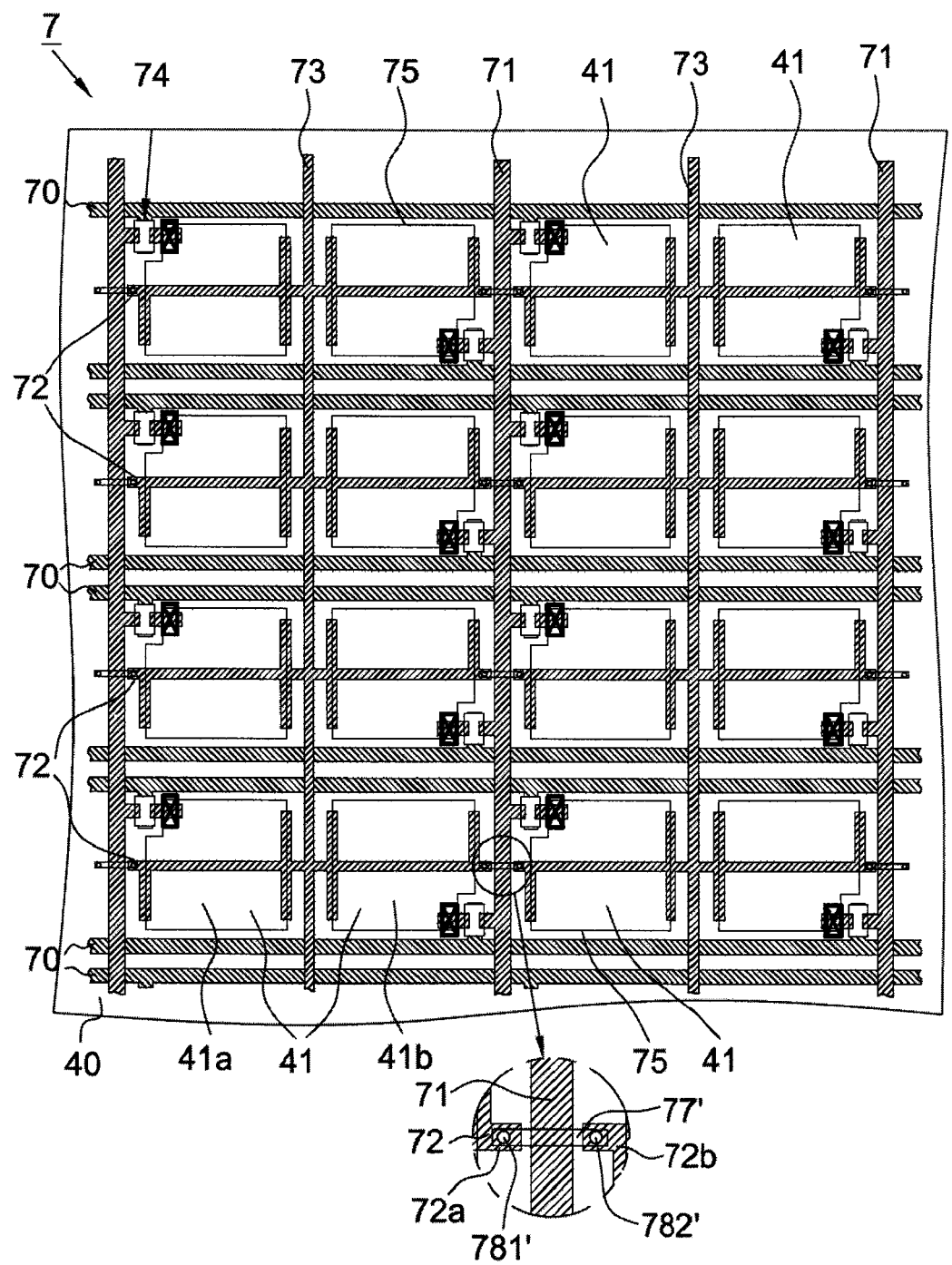
FIG. 13 is a top view of a TFT array substrate according to the second example of the third embodiment of the present invention.

Referring to FIG. 13, in the second example of the third embodiment, the gate lines 70 are also formed by photographing and etching a first metal layer, and the data lines 71 and the first and second common lines 72, 73 are also formed by photographing and etching a second metal layer. A passivation layer (not shown) is also disposed on the first and second common lines 72, 73. The differences between the TFT array substrate in the third and first examples of the third embodiment is that the first common line 72 includes a first segment 72a and a second segment 72b.

A plurality of first through holes 781' are formed in the passivation layer and corresponding to the first segment 72a. A plurality of second through holes 782' are formed in the passivation layer and corresponding to the second segment 72b. Each conductive element 77' is adapted to connect the first segment 72a to the second segment 72b via the first and second through holes 781', 782'. The conductive element 77' located between the first and second segments 72a, 72b of the first common lines 72 crosses the data line 71. The conductive element 77' and the pixel electrode 75 can be made of same transparent conductive material. In other words, the conductive element 77' and the pixel electrode 75 can be simultaneously formed by the same photographing and etching processes so as not to increase the manufacture time and cost.

Figure 14:
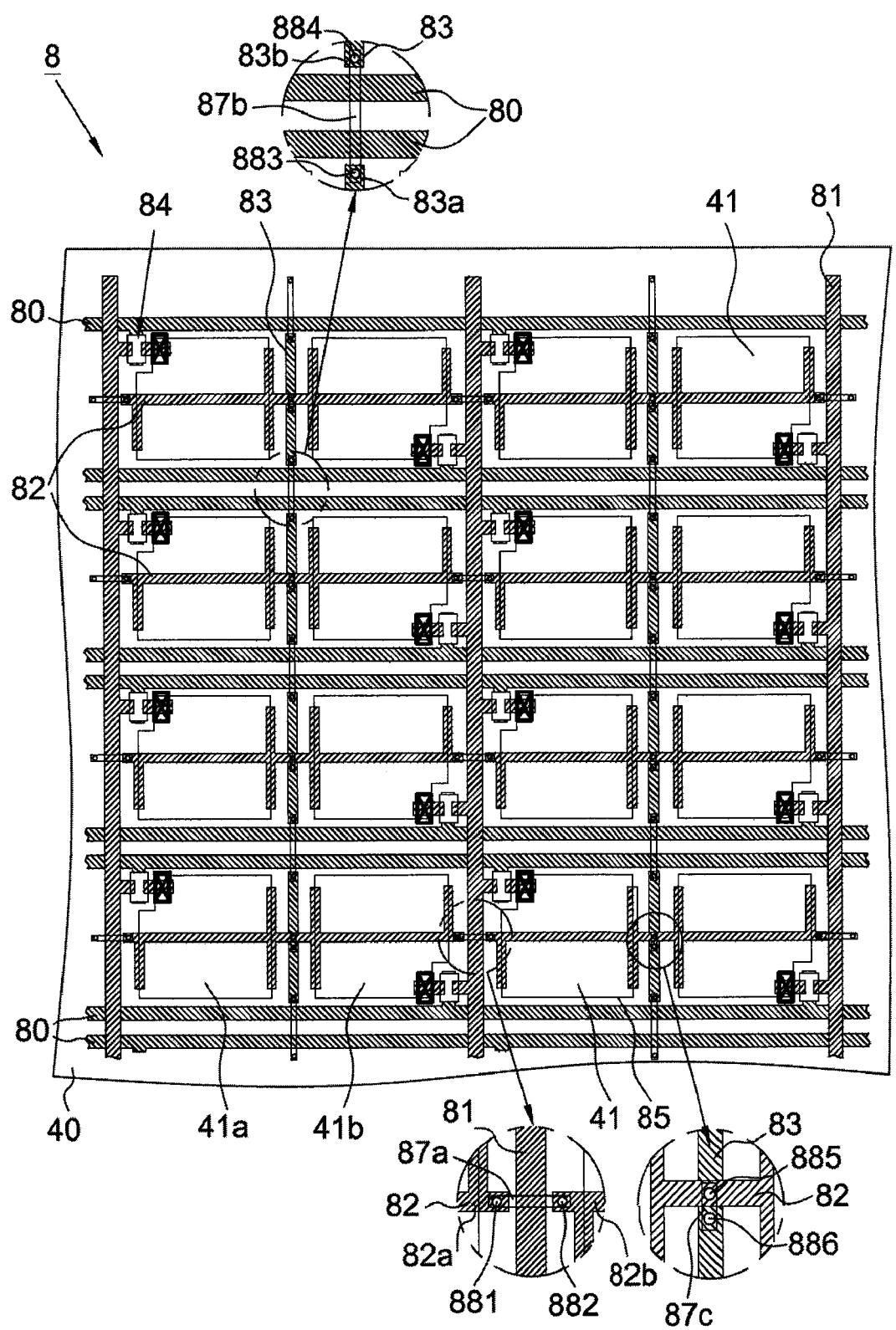
FIG. 14 is a top view of a TFT array substrate according to the fourth embodiment of the present invention.

FIG. 14 is a top view of a thin film transistor (TFT) array substrate 8 according to the fourth embodiment of the present invention. The TFT array substrate 8 in the fourth embodiment is similar to the TFT array substrate 2 in the first embodiment, wherein the similar elements are designated with the similar reference numerals. The TFT array substrate 8 includes a transparent substrate 40, a plurality of gate lines 80, data lines 81, pixel electrodes 85, first common lines 82, second common lines 83 and thin film transistors 84.

The first common lines 82 are parallel to the gate lines 80. The second common lines 83 are parallel to the data lines 81 and electrically connected to the first common lines 82. There is no data line located between the left and right pixel regions 41a, 41b, and thus each second common line 83 can be disposed between the left and right pixel regions 41a, 41b. The pixel electrodes 85 are disposed in the pixel regions 41 respectively. Particularly, the second common line 83 is located between the pixel electrodes 85 of the left and right pixel regions 41a, 41b. The coupling between the adjacent two pixel electrodes 85 with the second common line 83 located therebetween is lower than the coupling between the adjacent two pixel electrodes 85 without the second common line 83 located therebetween. The reduction of the coupling between the adjacent two pixel electrodes 85 can solve a problem of bright and dark lines.

In the fourth embodiment, the differences between the TFT array substrate in the fourth and first embodiments is that the gate lines 80 and the second common lines 83 are formed by photographing and etching a first metal layer, and the data lines 81 and the first common lines 82 are formed by photographing and etching a second metal layer. A gate insulating layer (not shown) is disposed between the first and second metal layers. A passivation layer (not shown) is disposed on the first common line 82. The first common line 82 includes a first segment 82a and a second segment 82b, and the second common line 83 includes a third segment 83a and a fourth segment 83b.

A plurality of first through holes 881 are formed in the passivation layer and corresponding to the first segment 82a. A plurality of second through holes 882 are formed in the passivation layer and corresponding to the second segment 82b. Each conductive element 87a is adapted to connect the first segment 82a to the second segment 82b via the first and second through holes 881, 882. The conductive element 87a located between the first and second segments 82a, 82b of the first common line 82 crosses the data line 81. A plurality of third through holes 883 are formed in the gate insulating layer and corresponding to the third segment 83a. A plurality of fourth through holes 884 are formed in the gate insulating layer and corresponding to the fourth segment 83b. Each conductive element 87b is adapted to connect the third segment 83a to the fourth segment 83b via the third and fourth through holes 883, 884. The conductive element 87b located between the third and fourth segments 83a, 83b of the second common line 83 crosses the gate lines 80. A plurality of fifth through holes 885 are formed in passivation layer and corresponding to the first common lines 82 respectively, and a plurality of sixth through holes 886 are formed in the gate insulating and the passivation layer and corresponding to the second common lines 83 respectively. Each conductive element 87c is adapted to connect the first common line 82 to the second common line 83 via the fifth and sixth through holes 885, 886. The conductive elements 87a, 87b, 87c and the pixel electrode 85 can be made of same transparent conductive material. In other words, the conductive elements 87a, 87b, 87c and the pixel electrode 85 can be simultaneously formed by the same photographing and etching processes so as not to increase the manufacture time and cost.

Figure 15:
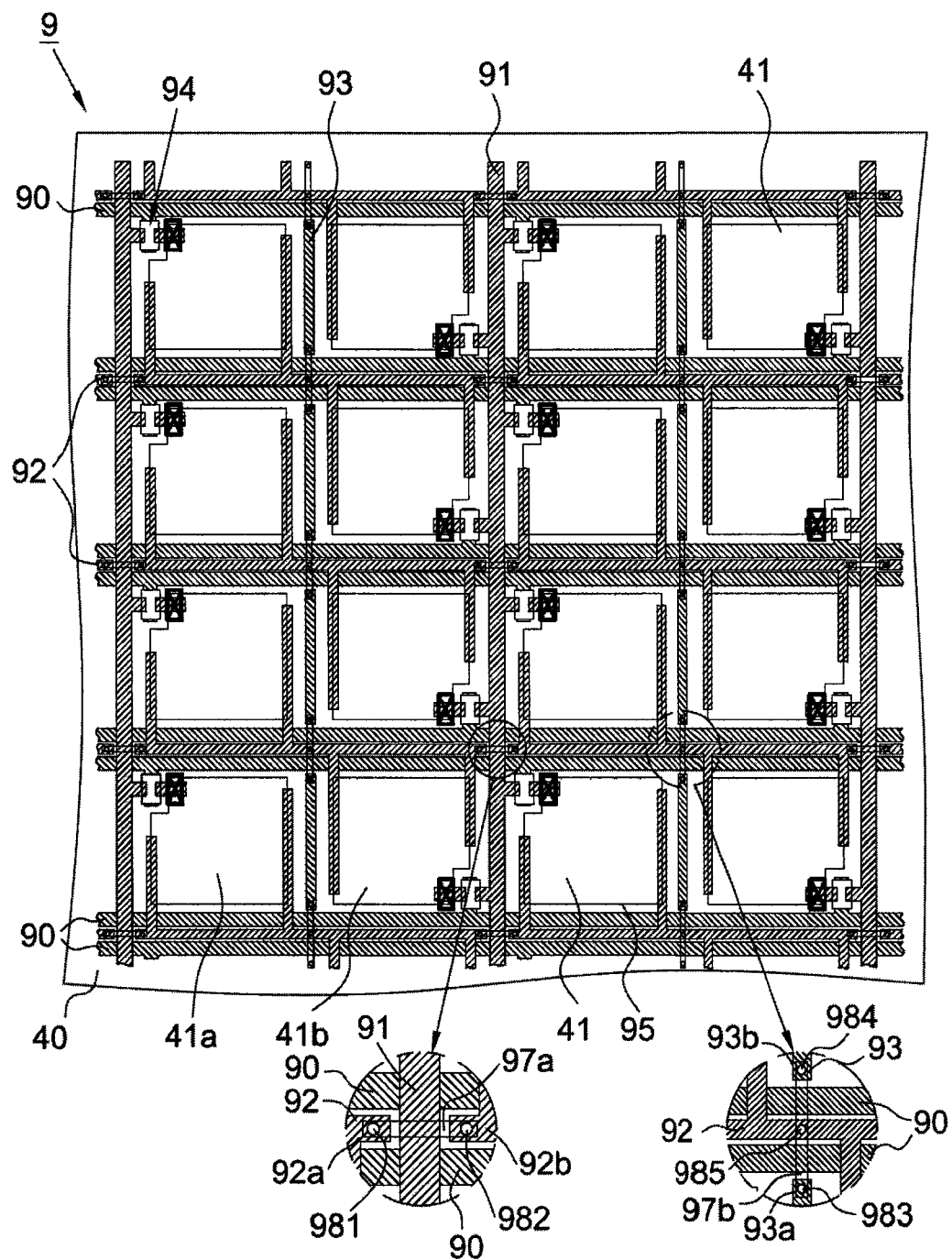
FIG. 15 is a top view of a TFT array substrate according to the fifth embodiment of the present invention.

FIG. 15 is a top view of a thin film transistor (TFT) array substrate 9 according to the fifth embodiment of the present invention. The TFT array substrate 9 in the fifth embodiment is similar to the TFT array substrate 8 in the fourth embodiment, wherein the similar elements are designated with the similar reference numerals. The TFT array substrate 9 includes a transparent substrate 40, a plurality of gate lines 90, data lines 91, pixel electrodes 95, first common lines 92, second common lines 93 and thin film transistors 94.

The first common lines 92 are parallel to the gate lines 90. The second common lines 93 are parallel to the data lines 91 and electrically connected to the first common lines 92. There is no data line located between the left and right pixel regions 41a, 41b, and thus each second common line 93 can be disposed between the left and right pixel regions 41a, 41b. The pixel electrodes 95 are disposed in the pixel regions 41 respectively. Particularly, the second common line 93 is located between the left and right pixel regions 41a, 41b. The coupling between the adjacent two pixel electrodes 95 with the second common line 93 located therebetween is lower than the coupling between the adjacent two pixel electrodes 95 without the second common line 93 located therebetween. The reduction of the coupling between the adjacent two pixel electrodes 55 can solve a problem of bright and dark lines.

In the fifth embodiment, the differences between the TFT array substrate in the fifth and fourth embodiments is that the first common lines 92 is located between two of gate lines 90 which are located between adjacent two of the pixel regions 41 located at upper and lower positions. The first common line 92 includes a first segment 92a and a second segment 92b, and the second common line 93 includes a third segment 93a and a fourth segment 93b.

A plurality of first through holes 981 are formed in the passivation layer (not shown) and corresponding to the first segment 92a. A plurality of second through holes 982 are formed in the passivation layer and corresponding to the first segment 92b. Each conductive element 97a is adapted to connect the first segment 92a to the second segment 92b via the first and second through holes 981, 982. The conductive element 97a located between the first and second segments 92a, 92b of the first common line 92 crosses the data line 91. A plurality of third through holes 983 are formed in the gate insulating layer (not shown) and corresponding to the third segment 93a. A plurality of fourth through holes 984 are formed in the gate insulating layer and corresponding to the fourth segment 93b. Each conductive element 97b is adapted to connect the third segment 93a to the fourth segment 93b via the third and fourth through holes 983, 984. The conductive element 97b located between the third and fourth segments 93a, 93b of the second common line 93 crosses the gate lines 90. A plurality of fifth through holes 985 are formed in passivation layer and corresponding to the first common lines 92 respectively. The conductive element 97b is also adapted to connect the first common line 92 to the second common line 93 via the third, fourth and fifth through holes 983, 984, 985. The conductive elements 97a, 97b and the pixel electrode 95 can be made of same transparent conductive material. In other words, the conductive elements 97a, 97b and the pixel electrode 95 can be simultaneously formed by the same photographing and etching processes so as not to increase the manufacture time and cost.

Figure 16:
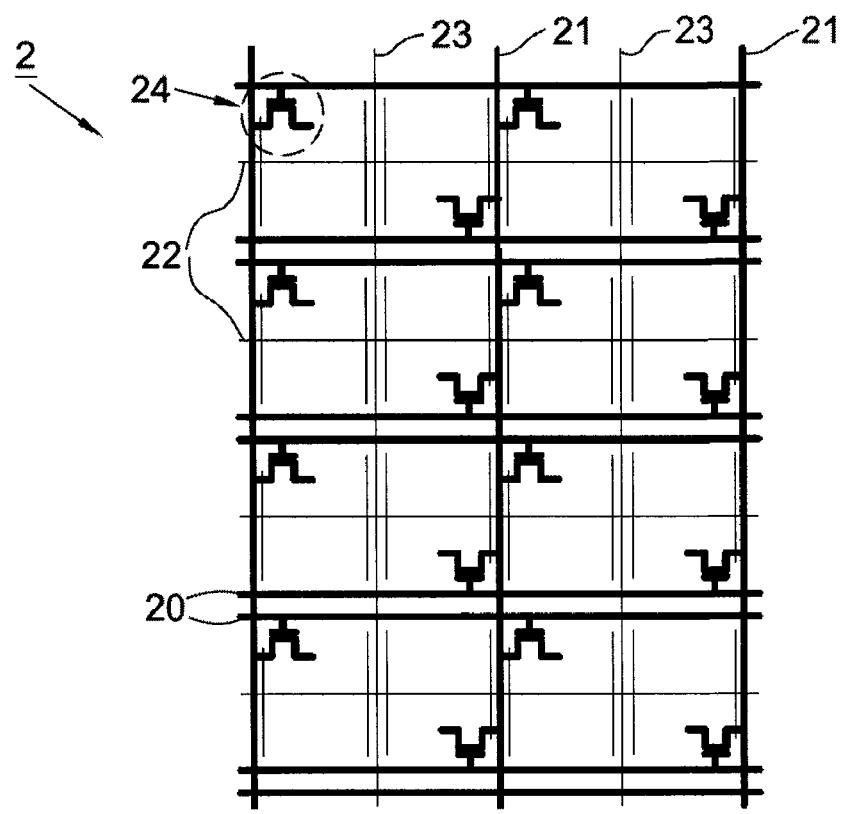
FIG. 16 is a circuit diagram of the TFT array substrate in the first embodiment of the present invention.
Figure 17:
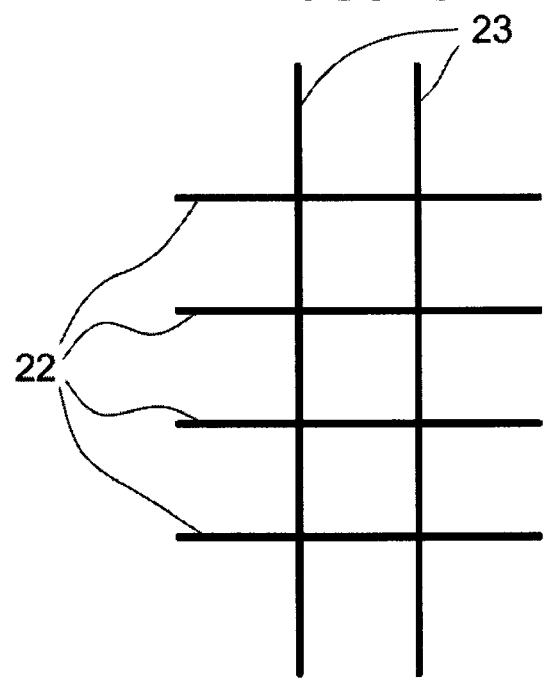
FIG. 17 shows that the first common lines and second common lines are formed to a reticular structure in the first embodiment of the present invention.

Referring to FIG. 16, it depicts a circuit diagram of the TFT array substrate 2 in the first embodiment. The TFT array substrate 2 includes the gate lines 20, data lines 21, first common lines 22, second common lines 23 and thin film transistors 24. The second common lines 23 are electrically connected to the first common lines 22. Thus, FIG. 17 shows that the first common lines 22 and second common lines 23 are formed to a reticular structure in the first embodiment of the present invention. Likewise, the second common lines are electrically connected to the first common lines of the TFT array substrates in the second to fifth embodiments, whereby the first common lines and second common lines are formed to a reticular structure so as to reduce RC delay effect of the common line.

Figure 18:
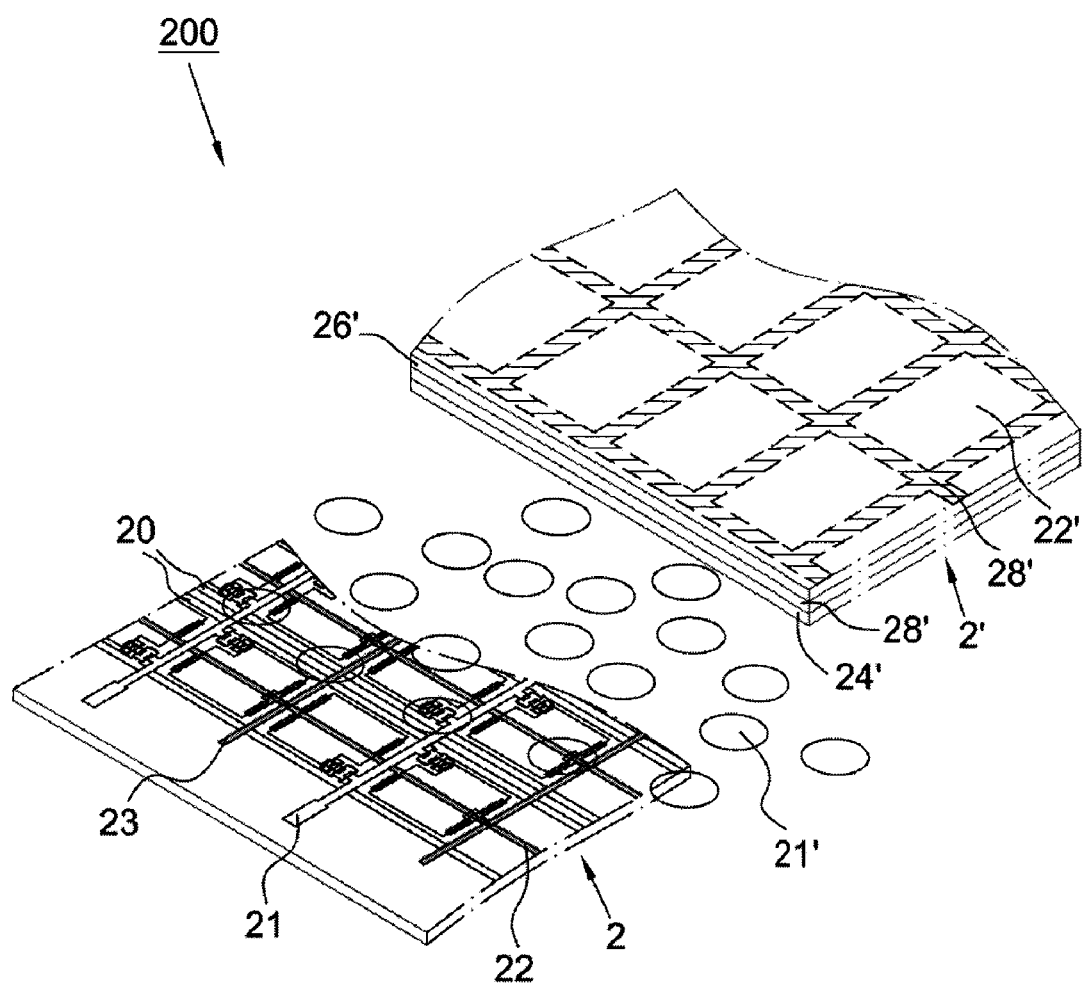
FIG. 18 is an exploded perspective view of a liquid crystal display panel according to the first embodiment of the present invention.

Referring to FIG. 18, it depicts a liquid crystal display (LCD) panel 200. The TFT array substrate 2 in the first embodiment can be applied to the LCD panel 200. The LCD panel 200 includes the TFT array substrate 2, a color filter (CF) substrate 2' and a liquid crystal layer 21'. The liquid crystal layer 21' is located between the TFT array substrate 2 and the CF substrate 2'. The CF substrate 2' includes a plurality of black matrix layer 28', a color filter layer 22' and a transparent electrode 24', which all are formed on another transparent substrate 26' in order. The black matrix layer 28' must be corresponding to the data lines 21 and the gate lines 20 together with the second common line 23 so as to avoid the light leakage.

Figure 19:
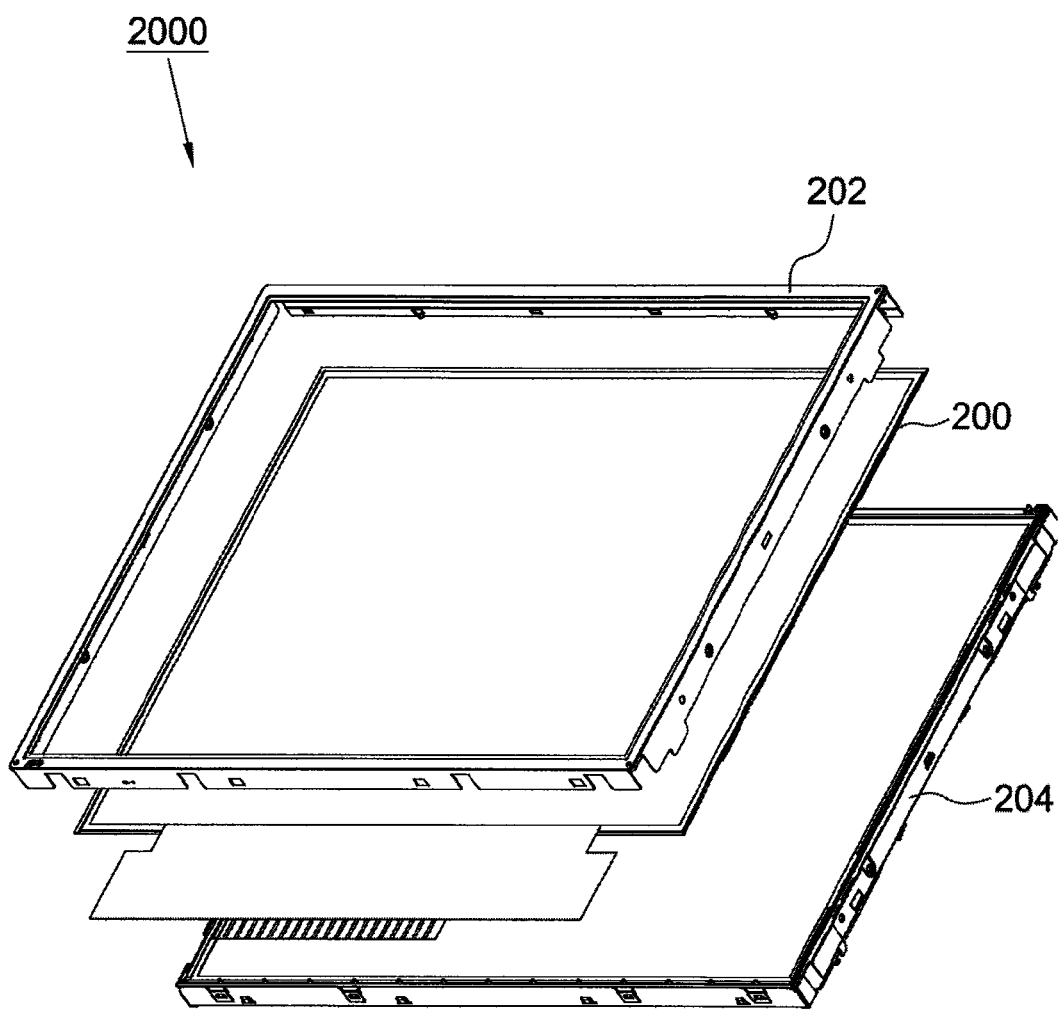
FIG. 19 is an exploded perspective view of a liquid crystal display according to the first embodiment of the present invention.

Referring to FIG. 19, it depicts a liquid crystal display 2000. The LCD panel 200 in the first embodiment can be applied to the liquid crystal display 2000. The liquid crystal display 2000 includes a front frame 202, the LCD panel 200 and a backlight module 204. The backlight module 204 provides the LCD panel 200 with a uniform backlight, and is assembled with the front frame 202, whereby the front frame 202, the LCD panel 200 and the backlight module 204 are combined to the liquid crystal display 2000.

Although the invention has been explained in relation to its preferred embodiment, it is not used to limit the invention. It is to be understood that any other possible modifications and variations can be made by those skilled in the art without departing from the spirit and scope of the invention as hereinafter claimed.

What is claimed is:

1. A thin film transistor (TFT) array substrate comprising:
a transparent substrate;
a plurality of gate lines disposed on the transparent substrate;
a plurality of data lines crossing the gate lines, wherein there are two pixel regions being a left pixel region and a right pixel region defined by adjacent two of the gate lines and adjacent two of the data lines;
a plurality of pixel electrodes located in the left and right pixel regions;
a plurality of first common lines parallel to the gate lines; and
a plurality of second common lines parallel to the data lines and electrically connected to the first common lines, wherein each second common line is disposed between the pixel electrodes located in the left and right pixel regions, and the second common lines are not overlapped with the pixel electrodes.

2. The TFT array substrate as claimed in claim 1, wherein:
the number of the gate lines is N+1, the first gate lines to the N+1-th gate lines are arranged in order, and N is a positive number;
there is no pixel region defined by the N-th and N+1-th gate lines and adjacent two of the data lines, when N is an even number; and there are two pixel regions being a left pixel region and a right pixel region defined by the N-th and N+1-th gate lines and adjacent two of the data lines, when N is an odd number.

3. The TFT array substrate as claimed in claim 1, wherein the gate lines and the first common lines are formed by photographing and etching a first metal layer, and the data lines and the second common lines are formed by photographing and etching a second metal layer.

4. The TFT array substrate as claimed in claim 3, further comprising:
a plurality of first through holes corresponding to the first common lines respectively;
a plurality of second through holes corresponding to the second common lines respectively; and
a plurality of conductive elements, each adapted to connect the corresponding first common line to the corresponding second common line via the corresponding first through hole and the corresponding second through hole.

5. The TFT array substrate as claimed in claim 4, wherein the conductive elements and the pixel electrodes are made of same transparent conductive material.

6. The TFT array substrate as claimed in claim 1, wherein the gate lines and the first and second common lines are formed by photographing and etching a first metal layer, and the data lines are formed by photographing and etching a second metal layer.

7. The TFT array substrate as claimed in claim 6, wherein:
the gate line comprises a first segment and a second segment; and
the TFT array substrate further comprises:
a first through hole corresponding to the first segment;
a second through hole corresponding to the second segment; and
a conductive element adapted to connect the first segment to the second segment via the first and second through holes.

8. The TFT array substrate as claimed in claim 7, wherein the conductive element located between the first and second segments of the gate line crosses the second common line.

9. The TFT array substrate as claimed in claim 6, wherein:
the second common line comprises a first segment and a second segment; and
the TFT array substrate further comprises:
a first through hole corresponding to the first segment;
a second through hole corresponding to the second segment; and
a conductive element adapted to connect the first segment to the second segment via the first and second through holes.

10. The TFT array substrate as claimed in claim 9, wherein the conductive element located between the first and second segments of the second common line crosses the gate lines.

11. The TFT array substrate as claimed in claim 1, wherein the gate lines are formed by photographing and etching a first metal layer, and the data lines and the first and second common lines are formed by photographing and etching a second metal layer.

12. The TFT array substrate as claimed in claim 11, wherein:
the data line comprises a first segment and a second segment; and
the TFT array substrate further comprises:
a first through hole corresponding to the first segment;
a second through hole corresponding to the second segment; and
a conductive element adapted to connect the first segment to the second segment via the first and second through holes.

13. The TFT array substrate as claimed in claim 12, wherein the conductive element located between the first and second segments of the data line crosses the first common line.

14. The TFT array substrate as claimed in claim 11, wherein:
the first common line comprises a first segment and a second segment; and
the TFT array substrate further comprises:
a first through hole corresponding to the first segment;
a second through hole corresponding to the second segment; and
a conductive element adapted to connect the first segment to the second segment via the first and second through holes.

15. The TFT array substrate as claimed in claim 14, wherein the conductive element located between the first and second segments of the first common lines crosses the data line.

16. The TFT array substrate as claimed in claim 1, wherein the gate lines and the second common lines are formed by photographing and etching a first metal layer, and the data lines and the first common lines are formed by photographing and etching a second metal layer.

17. The TFT array substrate as claimed in claim 16, wherein:
the first common line comprises a first segment and a second segment;
the second common line comprises a third segment and a fourth segment; and
the TFT array substrate further comprises:
a first through hole corresponding to the first segment;
a second through hole corresponding to the second segment;
a first conductive element adapted to connect the first segment to the second segment via the first and second through holes;
a third through hole corresponding to the third segment;
a fourth through hole corresponding to the fourth segment;
a second conductive element adapted to connect the third segment to the fourth segment via the third and fourth through holes;
a fifth through hole corresponding to the first common line;
a sixth through hole corresponding to the second common line; and
a third conductive element adapted to connect the first common line to the second common line via the fifth and six through holes.

18. The TFT array substrate as claimed in claim 17, wherein the first conductive element located between the first and second segments of the first common line crosses the data line, and the second conductive element located between the third and fourth segments of the second common line crosses the gate lines.

19. The TFT array substrate as claimed in claim 16, wherein each first common line is disposed between two of the gate lines which are disposed between adjacent two of the pixel regions located at upper and lower positions.

20. The TFT array substrate as claimed in claim 19, wherein:
the first common line comprises a first segment and a second segment;

the second common line comprises a third segment and a fourth segment; and the TFT array substrate further comprises:
- a first through hole corresponding to the first segment;
- a second through hole corresponding to the second segment;
- a first conductive element adapted to connect the first segment to the second segment via the first and second through holes;
- a third through hole corresponding to the third segment;
- a fourth through hole corresponding to the fourth segment;
- a fifth through hole corresponding to the first common line; and
- a second conductive element adapted to connect the third segment to the fourth segment and to connect the first common line to the second common line via the third, fourth and fifth through holes.

21. The TFT array substrate as claimed in claim 20, wherein the first conductive element located between the first and second segments of the first common line crosses the data line, and the second conductive element located between the third and fourth segments of the second common line crosses the gate lines.

22. A liquid crystal display panel comprising:
a color filter (CF) substrate;
a thin film transistor (TFT) array substrate comprising:
- a transparent substrate;
- a plurality of gate lines disposed on the transparent substrate;
- a plurality of data lines crossing the gate lines, wherein there are two pixel regions being a left pixel region and a right pixel region defined by adjacent two of the gate lines and adjacent two of the data lines;
- a plurality of pixel electrodes located in the pixel regions respectively;
- a plurality of first common lines parallel to the gate lines; and
- a plurality of second common lines parallel to the data lines and electrically connected to the first common lines, wherein each second common line is disposed between the pixel regions located in the first and second pixel regions, and the second common lines are not overlapped with the pixel electrodes; and a liquid crystal layer is disposed between the TFT array substrate and the CF substrate.

23. The liquid crystal display panel as claimed in claim 22, wherein the CF substrate comprises a black matrix layer corresponding to the second common line.

* * * * *